(12) United States Patent
Widdows (10) Patent No.: US 10,142,330 B2
(45) Date of Patent: *Nov. 27, 2018

(54) LOCKING SYSTEMS WITH MULTIFACTOR AUTHENTICATION AND CHANGING PASSCODES

(71) Applicant: Matt Widdows, Scottsdale, AZ (US)

(72) Inventor: Matt Widdows, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,824

(22) Filed: Mar. 2, 2018

(65) Prior Publication Data

US 2018/0302397 A1 Oct. 18, 2018

Related U.S. Application Data

(63) Continuation of application No. 15/488,264, filed on Apr. 14, 2017, now Pat. No. 9,912,659.

(51) Int. Cl.
*H04L 29/06* (2006.01)
*H04W 12/06* (2009.01)
*G06F 7/04* (2006.01)
*G06F 15/16* (2006.01)
*G06F 17/30* (2006.01)

(52) U.S. Cl.
CPC ........ *H04L 63/0846* (2013.01); *H04L 63/068* (2013.01); *H04L 63/0853* (2013.01); *H04W 12/06* (2013.01)

(58) Field of Classification Search
None
See application file for complete search history.

(56) References Cited

U.S. PATENT DOCUMENTS

| 7,012,503 | B2 | 3/2006 | Nielsen |
| 8,260,262 | B2 | 9/2012 | Kyed |
| 9,077,716 | B2 | 7/2015 | Myers et al. |
| 9,210,150 | B2 | 12/2015 | Grim et al. |
| 9,305,412 | B2 | 4/2016 | Winkelman |

(Continued)

FOREIGN PATENT DOCUMENTS

| WO | 2014112695 | 7/2014 |
| WO | 2016089832 | 6/2016 |

OTHER PUBLICATIONS

USPTO; Non-Final Office Action dated Jul. 5, 2017 in U.S. Appl. No. 15/488,264.

(Continued)

*Primary Examiner* — Eric Chen
(74) *Attorney, Agent, or Firm* — Snell & Wilmer L.L.P.

(57) ABSTRACT

A computer-based locking system using changing passcodes includes an application server and an application in electronic communication with the application server. The application runs on a computing device. The application may request an input passcode from the application server based on a lock ID. The application server retrieves an algorithm from a database using the lock ID and generates the input passcode using the algorithm with a time as the input. A lock includes a passcode interface and a locking mechanism with the passcode interface being capable of capturing the input passcode. The lock executes the algorithm locally to generate a local passcode based on current time. The lock releases the locking mechanism in response to the input passcode matching the local passcode.

20 Claims, 3 Drawing Sheets

(56) References Cited

U.S. PATENT DOCUMENTS

| | | | |
|---|---|---|---|
| 9,455,839 B2 | 9/2016 | Conrad et al. | |
| 9,501,883 B2 | 11/2016 | Handville et al. | |
| 9,912,659 B1 | 3/2018 | Widdows | |
| 2008/0207335 A1 | 8/2008 | DiMichele | |
| 2011/0128121 A1* | 6/2011 | Shachar | G07C 9/00309 340/5.24 |
| 2012/0299700 A1* | 11/2012 | Davis | G07C 9/00571 340/5.54 |
| 2014/0019699 A1* | 1/2014 | Cohen | G06F 12/14 711/163 |
| 2014/0051425 A1 | 2/2014 | Ahearn et al. | |
| 2014/0236350 A1* | 8/2014 | Woodard | G06Q 50/16 700/237 |
| 2014/0375422 A1* | 12/2014 | Huber | G07C 9/00174 340/5.61 |
| 2015/0179012 A1* | 6/2015 | Sharpe | G07C 9/00904 340/5.28 |

OTHER PUBLICATIONS

USPTO; Notice of Allowance dated Jan. 16, 2018 in U.S. Appl. No. 15/488,264.

* cited by examiner

LOCKING SYSTEMS WITH MULTIFACTOR AUTHENTICATION AND CHANGING PASSCODES

CROSS-REFERENCE TO RELATED APPLICATIONS

This application is a Continuation of and claims priority to U.S. patent application Ser. No. 15/488,264 filed Apr. 14, 2017, which is incorporated herein by reference in its entirety.

FIELD

The disclosure relates generally to locking systems with changing passcodes.

BACKGROUND

Individuals have long needed to lock up personal belongings and property including houses, storage units, bikes, lockers, and cars. Companies likewise share a similar interest in securing their premises and property. Carrying a key can be cumbersome, while passwords and passcodes tend to become less secure over time. Passcode locks often come with the ability to manually set a passcode, and to manually change the passcode at will. Users nevertheless rarely change a passcode after the first day of owning the lock, leading to potential security breaches.

One example of locked items where security is paramount is the real estate industry. Strangers are invited to see a home, usually in the company of a realtor but absent the property's owner. Typically, when a realtor shows a house, he/she accesses a lock box to retrieve the keys to the house. Realtors may carry a device that opens the lock box. Alternatively, they may receive a passcode or lock passcode in advance. However, unintended parties may thus gain entry by gaining control of a still-functioning device or passcode.

Continuing the above real estate industry example, locks on for-sale houses are often battery operated. Power consumption becomes problematic when the locks exhaust batteries at a high rate. Potential buyers are restricted from entering a house with a dead battery until the battery is replaced. Additionally, the real estate company maintaining the lock then has the additional maintenance tasks of checking battery levels and replacing batteries.

Furthermore, communication with such locks is problematic. An internet connection or cellular connection may be used to communicate with the lock, however these services consume power. Additionally, these services typically come with a subscription fee. Sellers would prefer not to pay a subscription fee at a vacant house solely for the benefit of a lock.

SUMMARY

Systems, methods, and devices (collectively, "the System") for operating locks and other security systems with changing passcodes or combinations are disclosed herein. The System may include an application server and an application in electronic communication with the application server. The application may run on a computing device such as, for example, a smartphone or other mobile device. The application may request an input passcode from the application server based on a lock identifier ("ID") associated with a lock. The application server retrieves an algorithm from a database using the lock ID and generates the input passcode using the algorithm with a time as the input. The algorithm may be unique to the lock, or assigned to the lock from a group of algorithms, for example. The lock associated with the lock ID includes a passcode interface and a locking mechanism with the passcode interface being capable of capturing the input passcode. The lock executes the algorithm locally to generate a local passcode based on current time. A local passcode as described herein is a passcode generated by the lock using integrated processing capabilities. The lock releases the locking mechanism in response to the input passcode matching the local passcode.

In various embodiments, the application server may use the current time as the time to generate the input passcode from the time using the algorithm. The request from the application may include the future time, and the application server may thus use the future time as the time to generate the input passcode. The passcode interface on the lock may include a keypad or a wireless communication interface. The application server may be configured to store a plurality of lock IDs each in association with a unique algorithm, or each in association with a lock algorithm selected from a plurality of predetermined algorithms. The lock may execute the algorithm locally to generate a plurality of local passcodes based on a plurality of times including a current time and times near the current time. The lock may then release the locking mechanism in response to the input passcode matching at least one local passcode from the plurality of local passcodes.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
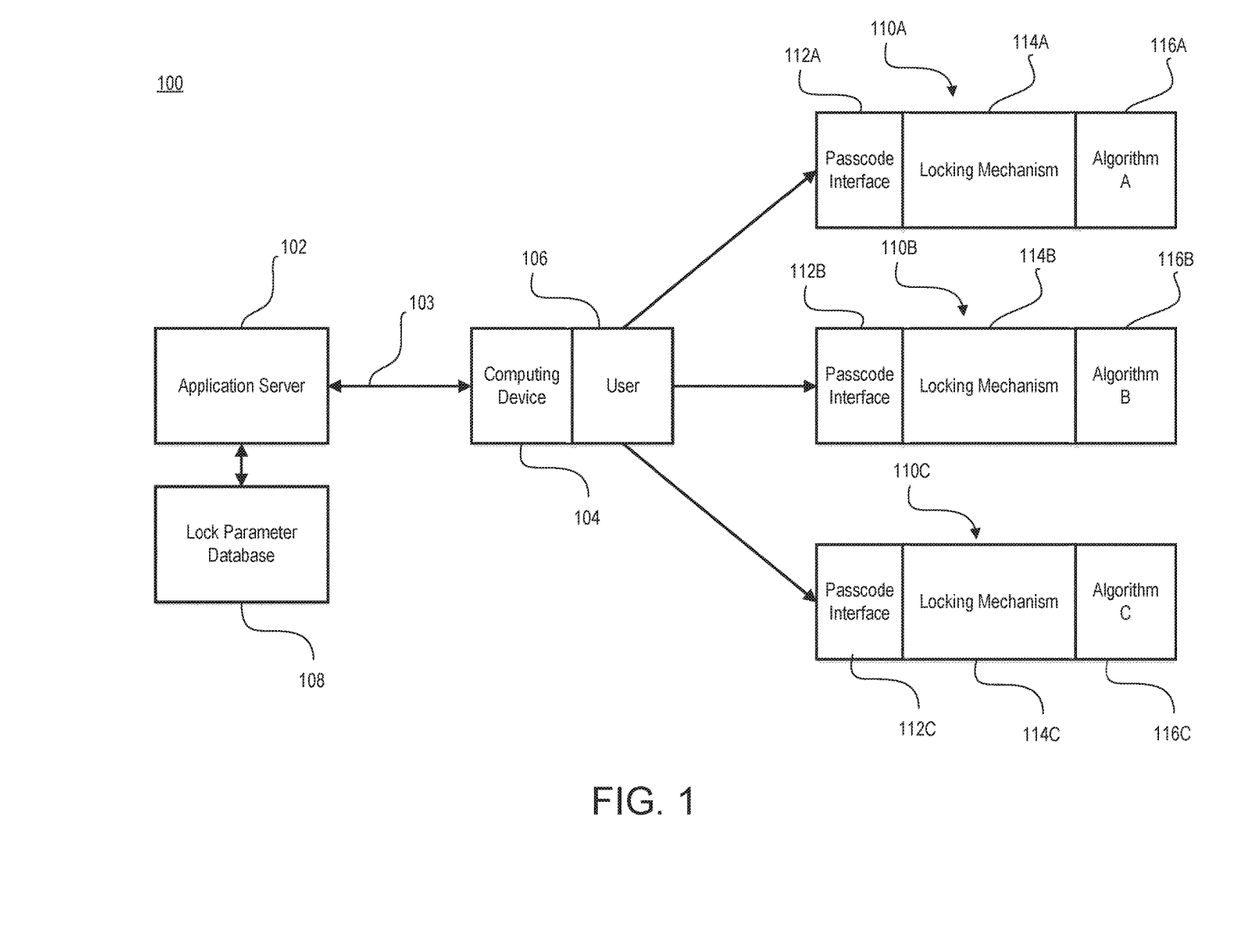
FIG. 1 illustrates a system for generating lock passcodes and unlocking locks, in accordance with various embodiments.

Referring now to FIG. 1, a system 100 for generating changing lock passcodes and operating locks is shown, in accordance with various embodiments. System 100 may include an application server 102 in communication with a computing device 104 over a network 103. Although the singular is used to describe application server 102, an application server as described herein may operate as a single computing device, a set of computing devices, or a distributed computing cluster, for example. Similarly, computing device 104 may be one or more computing devices capable of running a web application or native application to communicate with application server 102. Application server 102 and/or computing device 104 may thus have one or more processor configured to execute instructions retained in memory. In that regard, application server 102 and/or computing device 104 may thus include servers, computers, laptops, notebooks, hand held computers, personal digital assistants, cellular phones, smart phones (e.g., iPhone®, BlackBerry®, Android®, etc.) tablets, wearables, Internet of Things (IoT) devices, or any other device capable of sending and/or receiving data over the network 103.

Network 103 may be any suitable electronic link capable of carrying communication between two or more computing devices such as application server 102 and computing device 104. For example, network 103 may be local area network using TCP/IP communication or wide area network communicating at least in part over the Internet. Network 103 may also be an internal network isolated from the Internet in various embodiments for enhanced security. A network may be unsecure. Thus, communication over the network may utilize data encryption. Encryption may be performed by way of any of the techniques now available in the art or which may become available (e.g., Twofish, RSA, El Gamal, Schorr signature, DSA, PGP, PKI, GPG, or other symmetric and asymmetric cryptography systems).

The application running on computing device 104 and in communication with application server 102 may thus receive and/or generate a code for user 106 to input into one or more locks 110 comprising locking units or systems. Each lock 110A, 110B, and 110C contains a corresponding passcode interface 112, locking mechanism 114, and algorithm 116.

In various embodiments, algorithm 116 may be executed on a processor and memory configured to execute a predetermined set of processing steps based in part on a local time as measured by the lock. Each lock 110 may thus include processors and one or more tangible, non-transitory memories and be capable of implementing logic to run the algorithm. The processor can be a general purpose processor, a digital signal processor (DSP), an application specific integrated circuit (ASIC), a field programmable gate array (FPGA) or other programmable logic device, discrete gate or transistor logic, discrete hardware components, other processing devices, or any combination thereof.

Algorithm 116 of each lock may be unique. For example, an algorithm performing a processing step on the lock serial number as part of passcode generation may ensure a unique output when combined with a one-to-one algorithm. Algorithm 116 of each lock may also be selected from a group of algorithms such that algorithm 116 for each lock may not be unique but the algorithm for each lock may still be unknown to attackers. The time used as an input to algorithm 116 may be the current time or a future time. In that regard, a user may request a passcode for a future date and time (e.g., 2:00 pm on Jan. 17, 2020) and the passcode generated based on the future time will be valid at the identified lock at that future time. A user present at the lock when requesting the passcode may use the current time as the requested time so that the current time is used in algorithm 116 and the passcode works immediately, but not in the future. In order to further facilitate transmission and/or entry of the passcode, the time may be rounded to the next 10 minute mark by both application server 102 and lock 110A.

As an example, algorithm 116A may include applying an MD5 hash function to the current POSIX time plus the number 104936. Algorithm 116B may include multiplying the time by 3 and applying a SHA1 algorithm, performing a string conversion, and appending the lock serial number to the end of the resulting string. Algorithm 116C may include taking the first 6 digits of the serial number of lock 110C and adding it to the first six digits of the current POSIX time.

These algorithms are given as examples of algorithms 116 for passcode generation, though any suitable algorithm may be used to generate a passcode based off time or other variables. For example, steps in an algorithm 116 may include division, subtraction, hash functions, lookup tables, quadratic functions, exponential functions, or string concatenation, string truncation, string shifting algorithms, or other suitable algorithms to generate a passcode. Arguments for use in processing may include a current time, a lock serial number, a lock ID, a constant, manufacture date, manufacture time, the initial synchronization time, or other suitable variables. The passcodes output from algorithms 116 may be numeric, alphanumeric, or may include special characters as desired. Algorithm 116 selected for each lock is repeatable by application server 102 given an input time. In that regard, lock 110 may calculate a matching passcode independently from application server 102 (or an application running on computing device 104). The locks 110 may use internal processors to compare a passcode input by a user at passcode interface 112 with a local passcode calculated locally by lock 110 using algorithm 116.

In various embodiments, application server 102 may be in communication with a lock parameter database 108. The lock parameter database may be maintained on application server 102 or on a separate server available for communication over a private network. The lock parameter database may associate a lock ID with the algorithm 116 installed on the lock having the lock ID. A unique number, a number that repeats rarely, or a number that repeats on another lock that is remote and unlikely to be discovered may thus be assigned to the lock and used as an ID. For example, a lock ID such as a serial number may be assigned to each lock 110. The lock ID may be stored in the database in association with an algorithm. Application server 102 may receive a request to a passcode that contains the lock ID, and generate a passcode using algorithm 116 retrieved from lock parameter database 108 based on the lock ID. For example, the application server may use a database interface library to submit a SQL query for the lock having lock ID number 234ikds001875, "select * from lock_algorithms where lock_ID=234ikds001875." In that regard, the lock ID may be used as a key field in lock parameter database 108.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, application server 102 may generate lock passcodes for transmission to computing device 104 using algorithm 116 retrieved from lock parameter database 108. The lock passcodes may also be calculated by the application running on computing device 104, though such a configuration may trade off processing burden on application server 102 for overall security of system 100 as the algorithms 116 may be more easily detected.

In various embodiments, the application running on computing device 104 and/or application server 102 may provide the passcode to user 106 for entry into passcode interface 112 by graphical display, sms, email, push notification, or other suitable communication channels.

User 106 may submit the passcode to lock 110 via passcode interface 112. Passcode interface may include a touch screen or keypad suitable for entering a passcode. For example, passcode interface may include a telephone-styled numeric keypad with * and # keys to signify the beginning and/or end of a passcode. Other keypad configurations are also suitable to passcode entry provided they contain the numbers, letters, and/or symbols used in the passcode. The computing device 104 may also be configured to transmit to the lock the passcode without requiring manual entry. For example, application server 102 may authenticate a user and enable the computing device 104 to transmit to a lock 110 a passcode using 802.11 wireless standards, Bluetooth® low energy (BLE), near field communication (NFC), or other suitable transmission channels. In that regard, passcode interface 112A of lock 110A, for example, may include a wireless communication interface capable of communicating with computing device 104. Locking mechanism 114 may unlock in response to a passcode entered at passcode interface 112 matching a passcode calculated locally by lock 110 using algorithm 116. In various embodiments, locking mechanism 114 may also unlock in response to a fixed master passcode being entered at passcode interface 112.

Figure 2:
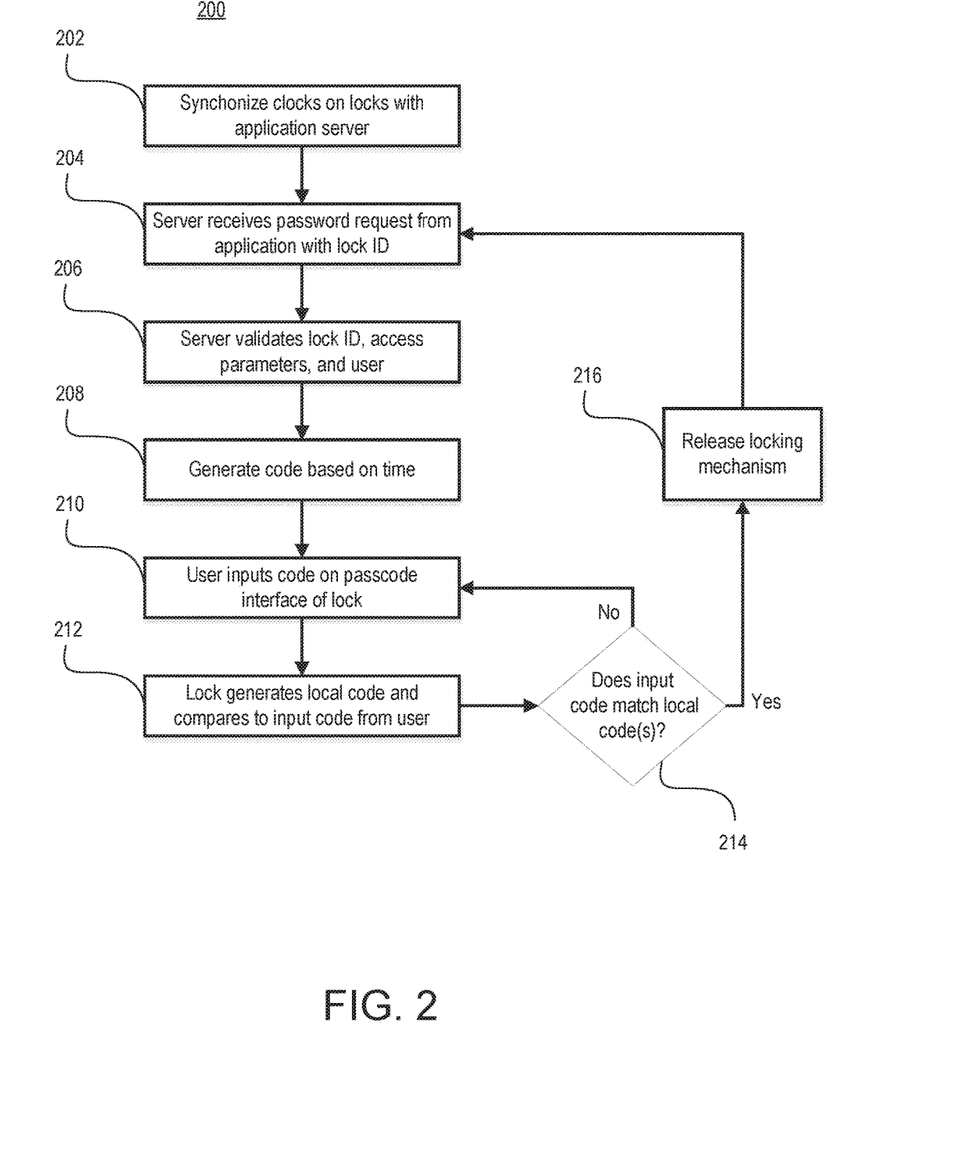
FIG. 2 illustrates a process for generating passcodes to unlock a lock at a predetermined time, in accordance with various embodiments.

With reference to FIG. 2, an exemplary process for operating locks with changing passcodes is shown for execution on system 100, in accordance with various embodiments. The passcodes may change based on time or in response to a triggering event. In that regard, the term changing passcodes as used herein may encompass rolling, converting, switching, shifting, transforming, varying, reconfiguring, recalculating, or otherwise changing passcodes. Locks 110 and application server 102 may have their clocks synchronized (Block 202). Clock synchronization may occur at the factory prior to shipping locks 110. Different clocks may lose time at varied rates. The clock on each lock 110 may be a configured to lose time at the same rate as a clock on application server 102. Additionally, each lock 110 may be configured to check each passcode input at passcode interface 112 against locally calculated codes across a range of times. Thus for each code input at passcode interface 112A, lock 110A may generate multiple passcodes over a range of times for comparison to the input code. The range of times may accommodate for the variation between times as read at lock 110A and application server 102 over time. Lock 110A may also monitor the time at which passcodes generated from the time match and use the time that generated the matching passcode to update its own time.

In various embodiments, synchronization may also be completed on a periodic basis. For example, locks 110 may be synchronized at a discrete time (e.g., initialization), once a month, once a year, or at other intervals. Locks 110 may be synchronized using a lock management application capable of running on a computing device similar to computing device 104 and in communication with the lock over either a wired or wireless protocol. In that regard, lock 110A may receive a time update, firmware update, or other update without lock 110A having direct and/or any Internet connectivity. Locks 110 may thus be functional without having internet connectivity. A lock 110 may also be configured to self-synchronize by taking as input an initial passcode based on the time and assigned algorithm, and then applying the algorithm to a series of times as inputs until a match is found. The lock 110 may then set its clock to the time that generated the match. The lock 110 may also have a data port such as a usb, firewire, micro-usb, serial, or other port capable of receiving time updates from a time update device plugged into the port.

Application server 102 may receive a request for a passcode for lock 110A from an application running on computing device 104 (Block 204). The request for the passcode may identify a lock 110A by a lock id or serial number. Application server 102 may retrieve or identify the algorithm 116A associated with the lock ID or serial number for lock 110A in lock parameter database 108.

In various embodiments, application server 102 and/or the application running on computing device 104 may authenticate a user 106, validate the lock ID, and/or check any access parameters associated with the lock ID (Block 206). Application server 102 may authenticate users by receiving security data from the application running on computing device 104 and comparing it against known values. The security data used for authentication may include, for example, one or more of a passcode, password, one-time password, security questions, biometric identifier, device ID or device fingerprint of the computing device 104. The user account for the user as logged-in to application running on computing device 104 may include characteristics, security groupings, categorizations, security clearances, or other characteristics of the user suitable for use in determining whether the user is authorized to receive a passcode for lock 110A.

In various embodiments, application server 102 may also check access parameters for lock 110A. Access parameters may be submitted to application server 102 by lock owners using a computing device 104 in communication with application server 102. Lock owners may thus set access parameters such as, for example, available dates and times, unavailable dates and times, groups of individuals authorized for access, unauthorized groups, individual authorizations, or other suitable limits. The limits may be based on the user characteristics associated with user accounts registered with application server 102. The limits may also be based on unrelated criteria. For example, access to the locks may be restricted for dates ranging from Dec. 17, 2024 to Jan. 1, 2018. Application server 102 may return an error message or otherwise decline to provide a passcode in response to the user authentication failing, the access parameters restricting the requested use, or an invalid lock ID.

In various embodiments, application server 102 may generate a passcode based at least in part on time (Block 208). Application server 102 may use algorithm 116A retrieved from the database to calculate the passcode. The time used by the application server 102 may be a POSIX time considering decimal places up to minutes, for example. For example, the time may include all or a subset of the date, hour, minute, second. Although time may be a preferred seed value for calculating passcodes due to the independently trackable value of time, other dynamic seed values may also be used. For example, a user may provide a seed value to application server 102. The server may provide to the user a passcode based on the seed value, and the user may provide both the seed value and the resulting passcode to lock 110A. The application server 102 may transmit the passcode to the application running on computing device 104.

In various embodiments, user 106 and/or computing device 104 may input the passcode in passcode interface 112A of lock 110A (Block 210). As described above, the user may key in the passcode using a keypad of passcode interface 112A. Lock 110A may capture the input passcode entered via passcode interface 112A and store the input passcode in memory temporarily for evaluation.

In various embodiments, lock 110A may generate a local passcode using algorithm 116A stored in lock 110A (Block 212). The local passcode may be calculated by lock 110A independently from the input passcode, which was calculated by application server 102 and/or computing device 104. The algorithm 116A used by lock 110A to generate the local passcode may be deterministic such that the same local passcode results from the same input used by application server 102. The lock 110A may thus use the time to generate the local passcode. Multiple times within a range may be used as inputs to generate local passcodes for comparison to the input passcode and determine whether the input passcode is valid.

In various embodiments, lock 110A may determine whether the input passcode matches the local passcode (Block 214). The comparison may be completed by a processor of lock 110A disclosed above. The lock may evaluate the input passcode compared to one or more locally calculated local passcodes to identify a match. The user may input another input passcode on the passcode interface 112A of lock 110A in response to the lock 110A rejecting the previously input passcode as not matching. Lock 110A may release locking mechanism 114A in response to the input passcode matching at least one locally calculated local passcode (Block 216). Locking mechanism 114A may include an electronically actuated locking mechanism such as a solenoid configured to change from a locked to an unlocked state in response to the local passcode matching the input passcode. Locking mechanism 114A may also include a fully or partially manually powered locking mechanism where a user provides mechanical force by depressing an unlock button or switch, for example.

Figure 3:
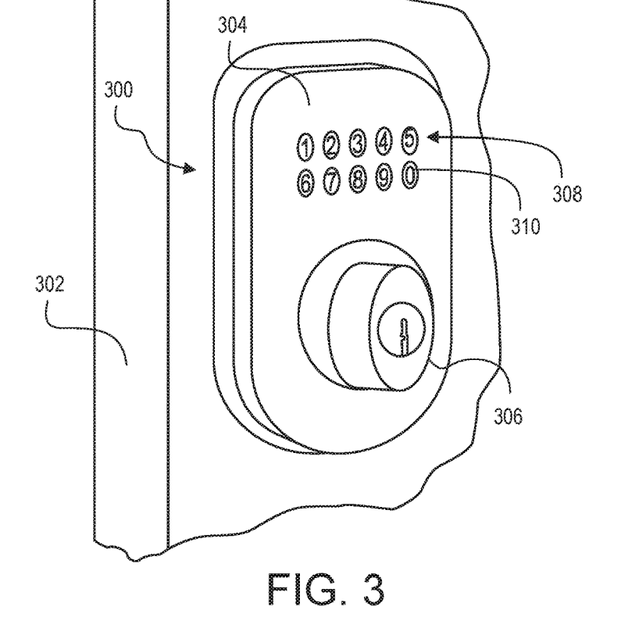
FIG. 3 illustrates a perspective view of a lock operable with changing passcodes installed in a door, in accordance with various embodiments.

Referring now to FIG. 3, a lock 300 operable using changing passcodes of the present disclosure is shown installed in door 302, in accordance with various embodiments. Lock 300 may include a housing 304 that engages door 302 in a fixed position. Housing 304 may retain and protect a power source, processor, and a locking mechanism. The power source may include one or more of a battery, a solar interface, a wired interface, or other suitable source for electricity. The processor may operate to generate updated passcodes as disclosed herein and compare the locally generated passcodes to passcodes input at keypad 308.

In various embodiments, housing 304 may include an electromechanical actuator suitable to rotate knob 306 in response to matching a passcode input using keys 310 of keypad 308 to a changing passcode calculated by lock 300. Knob 306 may also mechanically released to enable manual rotation in response to matching a passcode input using keys 310 of keypad 308 to a changing passcode calculated by lock 300. Rotation of knob 306 may trigger translation of a latch into or out of door 302 and/or a strike disposed in a door frame and shaped to receive the latch and retain door 302 in a closed position. Keypad 308 is illustrated as having numeric keys 0-9, though additional keys and/or symbols may be added to keypad 308 to increase passcode options.

Figure 4:
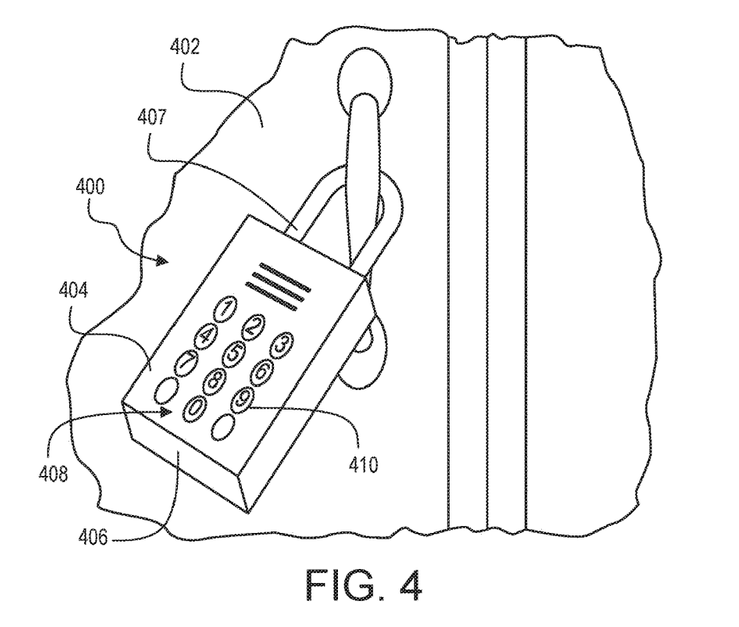
FIG. 4 illustrates a perspective view of a lock operable with changing passcodes hanging from a structure, in accordance with various embodiments.

With reference to FIG. 4, a lock 400 operable using changing passcodes of the present disclosure is shown hanging from structure 402, in accordance with various embodiments. Lock 400 may include housing 404 that retains and protect a power source, processor, and a locking mechanism similar to that described above in lock 300 of FIG. 3. Structure 402 may be a handle, a fence, a pole, a latch, or another structure defining an opening suitable to receive and securely retain shank 407.

In various embodiments, shank may unlock and translate away from housing 404 to open the closed loop and release lock 400 from structure 402. Shank 407 may unlock in response to a passcode input at keypad 408 using keys 410 as described herein. In that regard, lock 400 may lock a storage unit or locker. Shank 407 may also unlock in response to a key inserted and twisted in a typical key interface. Lock 400 may further include an openable base 406 that covers a cavity suitable to retain a key in response to a locally generated passcode matching a passcode input at keypad 408 using keys 410. In that regard, lock 400 may store a house key at a house currently for sale with the key retrievable by individuals having a correct passcode for a given time.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-based locking system using changing passcodes, comprising:
    an application server;
    an application running on a computing device and in electronic communication with the application server,
        wherein the application is configured to request an input passcode from the application server based on a lock ID,
        wherein the application server is configured to store a plurality of lock IDs each in association with a unique lock algorithm,
        wherein the application server is configured to retrieve an associated lock algorithm by accessing the lock ID, and
        wherein the application server is configured to generate the input passcode using the associated lock algorithm; and
    a lock comprising a passcode interface, a locking mechanism, and an electromechanical actuator,
        wherein the lock ID corresponds to the lock,
        wherein the passcode interface is configured to capture the input passcode,
        wherein the lock is configured to execute the associated lock algorithm locally to generate a plurality of local passcodes based on an input time including at least one of a current time and a time near the current time, and
        wherein the lock is configured to release the locking mechanism by actuating the electromechanical actuator to translate the locking mechanism into an open position, in response to the input passcode matching at least one local passcode from the plurality of local passcodes.

2. The computer-based locking system of claim 1, wherein the application server uses at least one of a current time or a near current time with the associated lock algorithm to generate the input passcode.

3. The computer-based locking system of claim 1, wherein:
    the request from the application includes a future time; and
    the application server uses the future time with the associated lock algorithm to generate the input passcode.

4. The computer-based locking system of claim 1, wherein the passcode interface comprises a keypad.

5. The computer-based locking system of claim 1, wherein the plurality of lock IDs are each stored in association with a lock algorithm selected from a plurality of predetermined algorithms.

6. The computer-based locking system of claim 1, wherein the passcode interface comprises a touchscreen.

7. A method comprising:
    storing, by the application server, a plurality of lock IDs each in association with a unique lock algorithm selected from a plurality of predetermined algorithms;
    receiving, by an application server, a request for an input passcode based on a lock ID;

retrieving, by the application server, an associated lock algorithm by accessing the lock ID;

generating, by the application server, the input passcode using the associated lock algorithm;

capturing, by a lock, the input passcode entered into a passcode interface;

executing, by the lock, the associated lock algorithm locally to generate a plurality of local passcodes based on an input time including at least one of a current time and a near current time; and releasing, by the lock, a locking mechanism by actuating an electromechanical actuator to trigger translation of the locking mechanism into an open position, in response to the input passcode matching at least one local passcode from the plurality of local passcodes.

8. The method of claim 7, wherein the application server uses at least one of a current time or a near current time with the associated lock algorithm to generate the input passcode.

9. The method of claim 7, wherein:
the request for the input passcode includes a future time; and
the application server uses the future time with the associated lock algorithm to generate the input passcode.

10. The method of claim 7, wherein the passcode interface comprises a keypad.

11. The method of claim 7, further comprising storing, by the application server, the plurality of lock IDs each in association with the lock algorithm selected from a plurality of predetermined algorithms.

12. The method of claim 7, further comprising checking, by the application server, an access parameter associated with the lock ID, in response to receiving the request for the input passcode.

13. The method of claim 12, where the access parameter comprises at least one of an available date, an available time, an unavailable date, an unavailable time, a group of individuals authorized for access, an unauthorized group of individuals, or an individual authorization.

14. A lock comprising:
a locking mechanism comprising a shank configured to translate away from the lock to release the lock and translate towards the lock to secure the lock, wherein the lock is associated with a unique lock ID; and
a passcode interface in communication with the locking mechanism and configured to receive an input passcode generated by a server based on a unique algorithm associated with the lock,
wherein the lock is configured to execute an algorithm locally to generate a plurality of local passcodes based on an input time including at least one of a current time and times near the current time, the algorithm corresponding to the unique algorithm of a plurality of predetermined algorithms selected by the server based on the unique lock ID, and
wherein the lock is configured to release the locking mechanism by translating the shank away from the lock, in response to the input passcode matching at least one local passcode from the plurality of local passcodes.

15. The lock of claim 14, wherein a clock maintained in the lock is synchronized with an application server.

16. The lock of claim 15, where the clock is synchronized using a lock management application in communication the lock over a wired protocol or wireless protocol.

17. The lock of claim 14, further comprising a processor configured to execute the algorithm locally to generate the local passcode based on the input time and compare the local passcode to the input passcode.

18. The lock of claim 14, wherein the passcode interface comprises a keypad.

19. The lock of claim 14, wherein the passcode interface comprises a wireless communication interface configured to communicate with a mobile computing device.

20. The lock of claim 14, wherein the passcode interface comprises a touchscreen.

* * * * *